J. PENSIS.
TROLLEY HARP.
APPLICATION FILED JAN. 31, 1908.
904,359.
Patented Nov. 17, 1908.
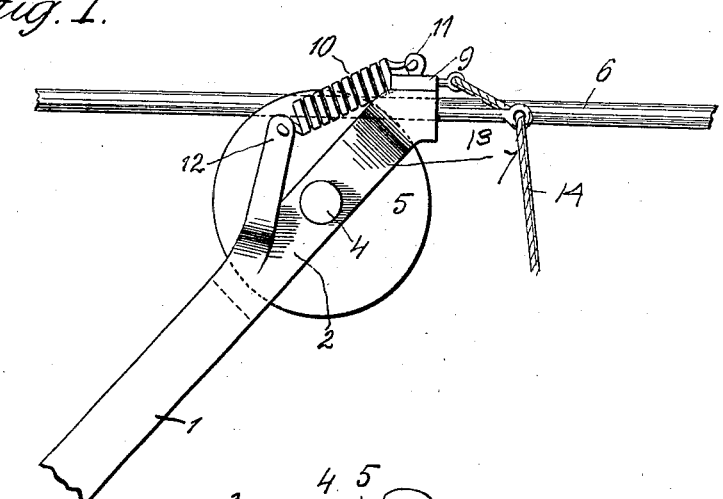
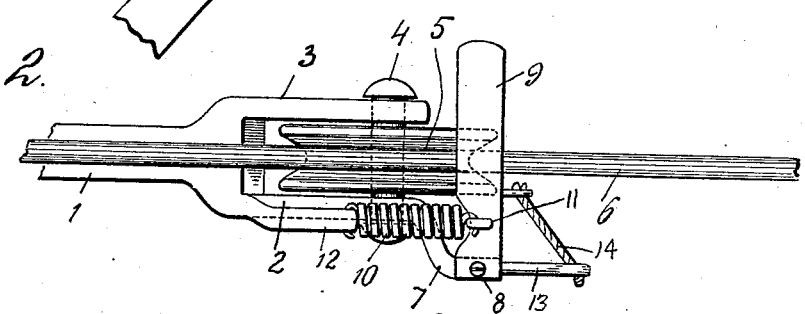
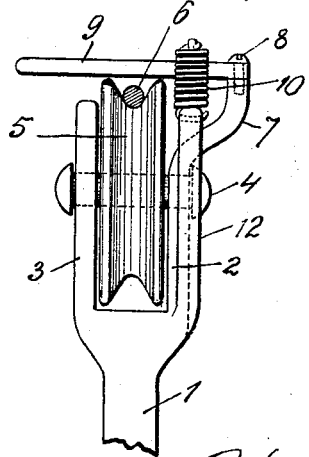
Inventor
J. PENSIS,

UNITED STATES PATENT OFFICE.

JOSEPH PENSIS, OF SPEERS, PENNSYLVANIA.

TROLLEY-HARP.

No. 904,359.  Specification of Letters Patent.  Patented Nov. 17, 1908.

Application filed January 31, 1908. Serial No. 413,542.

*To all whom it may concern:*

Be it known that I, JOSEPH PENSIS, a citizen of the United States of America, residing at Speers, in the county of Washington and State of Pennsylvania, have invented certain new and useful Improvements in Trolley-Harps, of which the following is a specification, reference being had therein to the accompanying drawing.

This invention relates to a trolley harp, and the primary object of the invention is, to provide a harp with positive and reliable means for retaining the trolley wheel thereof in engagement with the trolley wire or electrical conduit.

Another object of my invention is to provide simple and effective means for retaining a trolley wheel upon a trolley wire, without interfering with the trolley wire hangers or overhead construction.

My invention aims to prevent a trolley wheel from leaving the trolley wire due to the rapidity at which the same travels or to irregularities in the trolley wire. It is a well known fact that numerous accidents occur due to a trolley wheel leaving the trolley wire and placing the electrically actuated brakes out of commission. This is particularly so upon heavy grades, where hand brakes are not sufficient to retard the car.

My invention will be presently described in detail and reference will now be had to the drawing forming a part of this specification, wherein, Figure 1 is an elevation of the trolley harp constructed in accordance with my invention, Fig. 2 is a plan of the same, and Fig. 3 is an end view.

In the accompanying drawings, 1 designates a trolley pole on the upper end of which is mounted a harp comprising the usual harp body having prongs 2 and 3. In these prongs is journaled a pin 4 upon which the trolley wheel 5 is revolubly mounted, for engagement with the trolley wire 6.

The prong 2 of the harp is prolonged and is bent outwardly to form a supporting-arm 7, and upon the top of said arm, at the outer end thereof, is secured by a pivot pin or screw 8, a trolley-retaining bar 9 which is normally held transverse to the harp and trolley wire. This bar is held in its normal trolley-retaining position by means of a light coil spring 10 connected at one end to an eyelet 11 carried by the bar 9 and at its other end to an upwardly-projecting arm 12 carried by the prong 2 of the harp. The prolonged portion of the arm 2 of the harp constituting the supporting-arm 7 is provided in its outer end with a guide eyelet 13 through which the trolley rope 14 is extended, which rope is connected to the bar 9 at any desired point sufficiently removed from the pivot 8 to effect withdrawal of the bar 9 from its position across the trolley wire, when the rope 14 is pulled downwardly. The pivoted bar 9 lies in close proximity to the trolley wheel in its normal position, and prevents said wheel from "jumping" from the wire 6. When a hanger or similar overhead construction is encountered the bar 9 recedes or turns on its pivot point so as to permit the trolley wheel radially passing the obstruction.

Having now described my invention what I claim as new, is:—

In a trolley, the combination with the harp, one prong of which is prolonged beyond the other and extended outwardly to form a supporting arm, a trolley-retaining bar pivoted to said supporting-arm, an upwardly-extending arm carried by said harp, a spring connected at one end to said arm and at the other end to said retaining-bar, a guide-eyelet carried by the free end of said supporting-arm, and a rope extending through said guide-eyelet and connected to said retaining-bar for actuating the same.

In testimony whereof I affix my signature in the presence of two witnesses.

JOSEPH PENSIS.

Witnesses:
 Jos. G. GODISSART,
 DESIRE WALLET.